Oct. 27, 1964     T. PATRIGNANI     3,153,940
TRANSMISSION DEVICE
Filed May 10, 1962     5 Sheets-Sheet 2
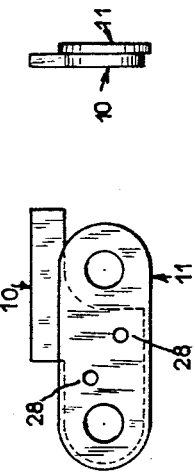
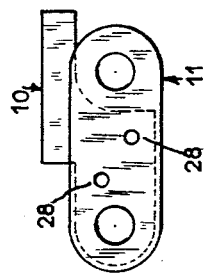
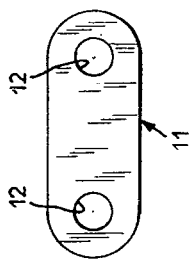
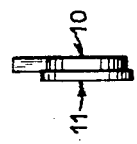
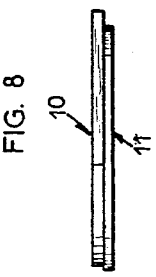
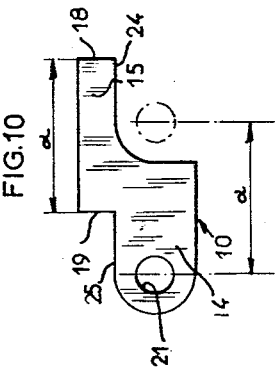
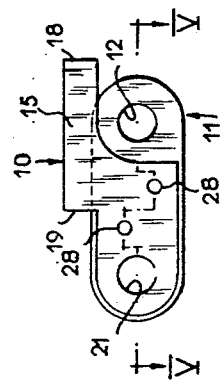
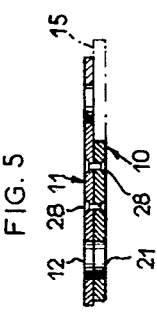

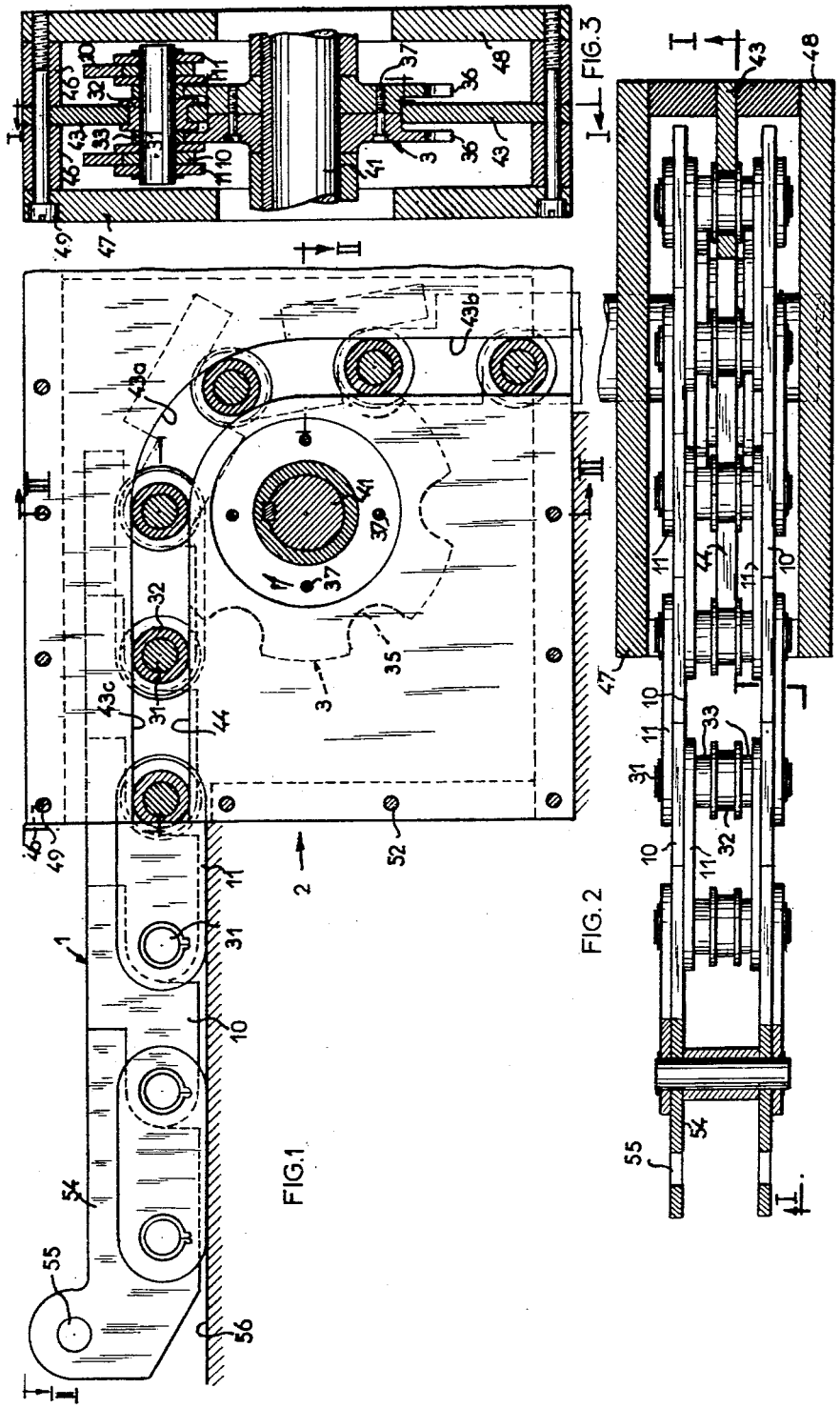

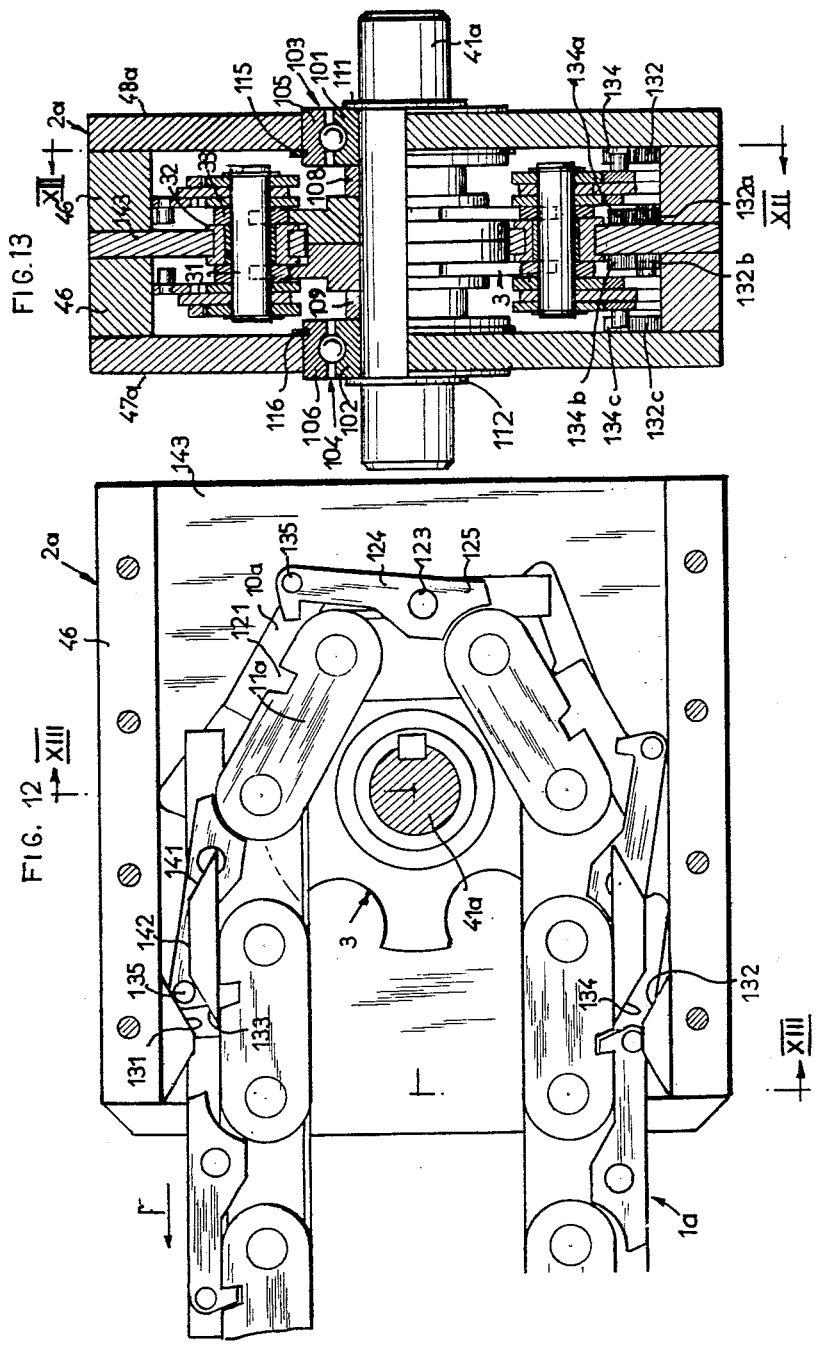

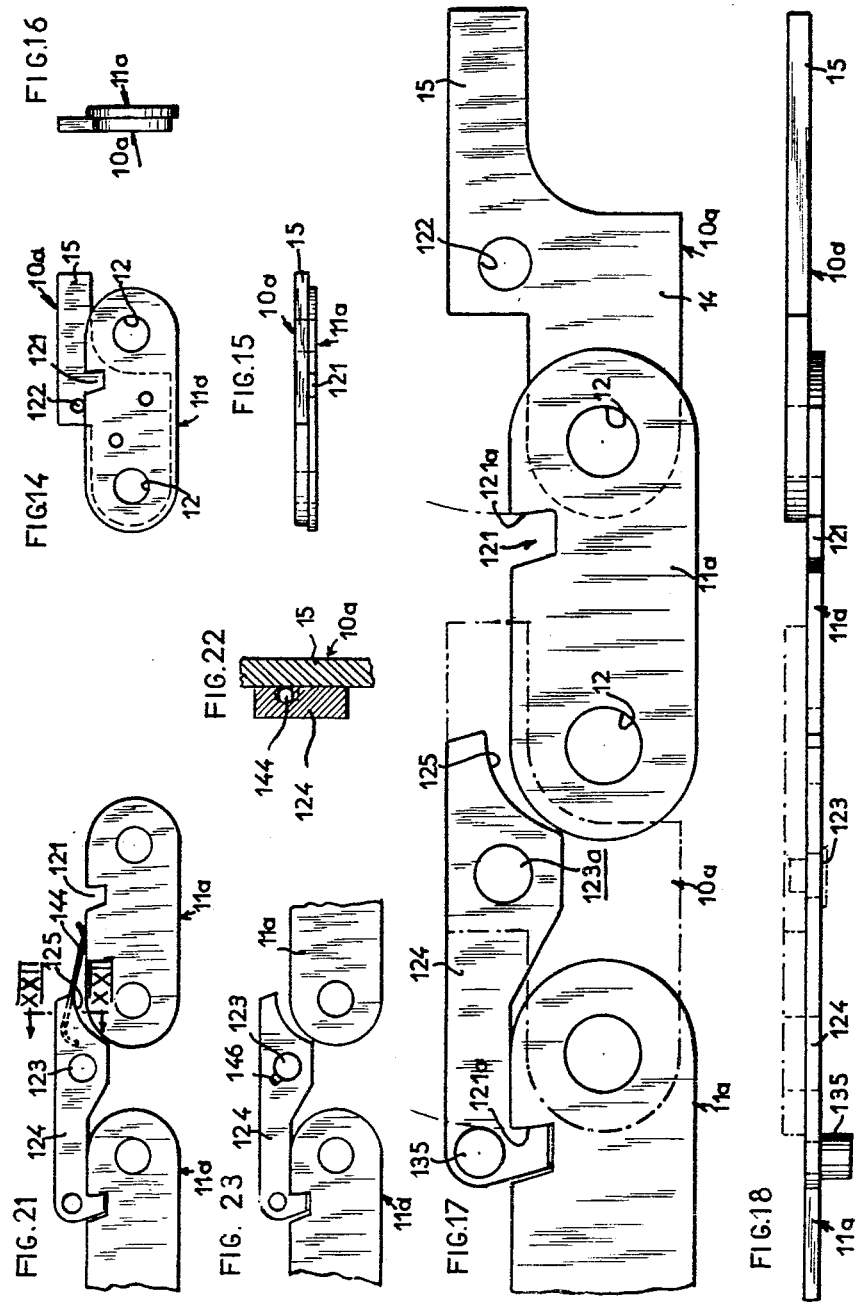

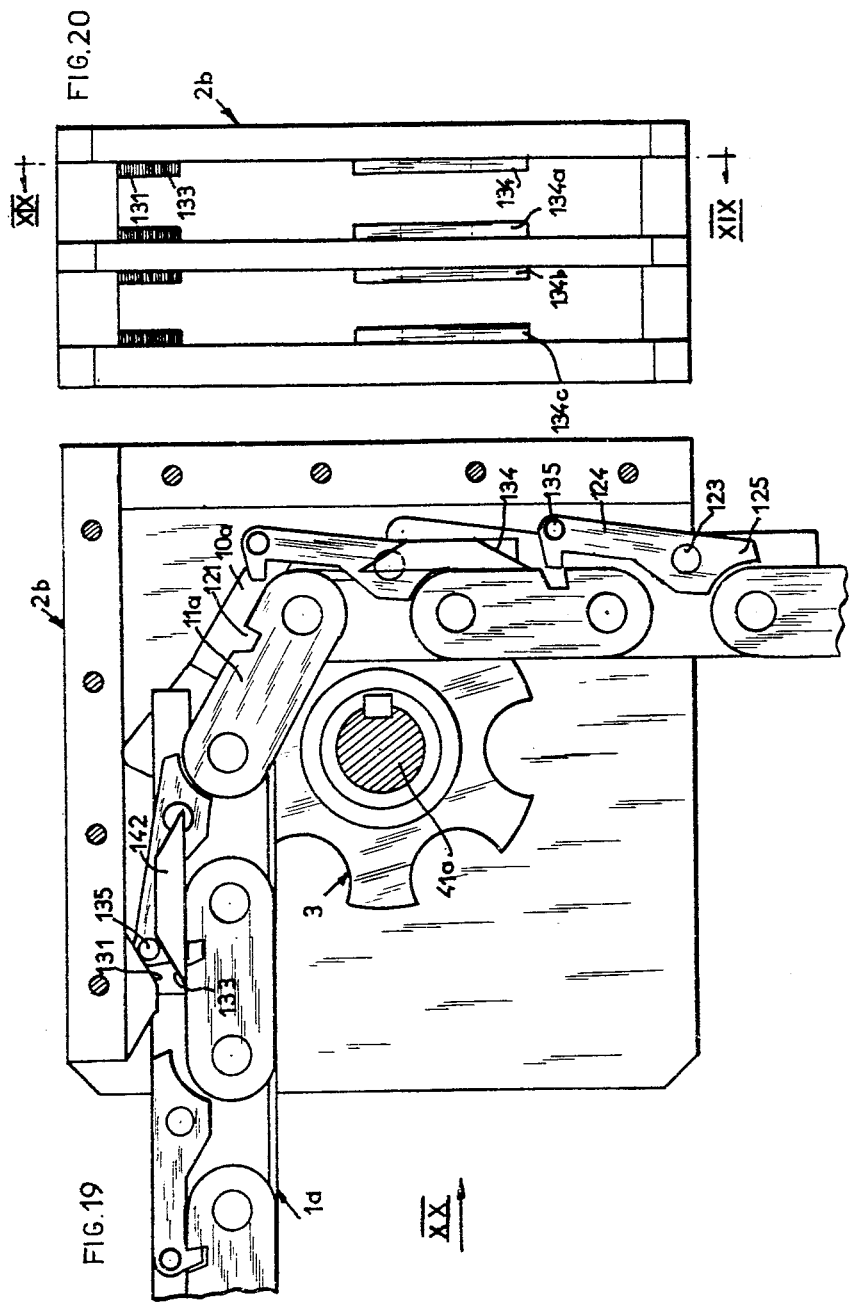

United States Patent Office 3,153,940
Patented Oct. 27, 1964

1

3,153,940
TRANSMISSION DEVICE
Théo Patrignani, Paris, France, assignor to Centre d'Etudes et d'Applications des Techniques de Production, Paris, France, a company of France
Filed May 10, 1962, Ser. No. 193,825
Claims priority, application France May 18, 1961
14 Claims. (Cl. 74—250)

This invention relates to a transmission device the essential component of which is a chain of special construction enabling it to transmit a force not only by pulling in the manner of conventional chains, but also by pushing, in which case it behaves like a rigid one-piece bar.

Each link in a chain according to the invention comprises a projecting portion provided with two operative front and rear faces, located on the outer side of the plane taken through the link pivots, as considered in relation to the tracking member or members over which the chain is to run, and the front operative face of each link butts against the rear operative face of the adjoining link when the particular chain section comprising those links stretches in a straight line.

By virtue of this special method of construction, the chain is able to transmit thrusting forces, for in that case the projections on the links contact one another in succession and thereby form together a veritable rigid bar. On the other hand, this feature in no way prevents the chain from operating in traction and wrapping itself around a sprocket, in the manner of an ordinary chain.

In accordance with a further particularity of the invention, each chain pivot retains an invariable position in relation to the two links it unites.

In one embodiment of this invention, the main portions of the links, which serve to establish connection with the pivots, consist of plates (hereinafter termed "mainplates"), arranged in alternation with auxiliary plates which bear the aforementioned projections and which are all located in the median plane of the chain. The auxiliary plates are thus partly imprisoned between the main plates, thereby providing a form of impaction which enhances the transverse rigidity of the chain.

In order to prevent the chain section subjected to compressive force from buckling at the pivotal points of its links, at least one of the end links of the chain terminates, in accordance with another feature of the invention, in a coupling member such as an eye, located on the outer side of the plane taken through the link pivots, as considered in relation to the members over which the chain runs.

It is a further object of the invention to provide a transmission device comprising a chain as hereinbefore described, and a sprocket wheel over which said chain runs and which is supported by a shaft mounted in a casing provided with a chain guiding member which is coaxial with said shaft and disposed along the length of the convex face of the chain, so that when a thrusting force is to be transmitted, the chain should be maintained in engagement with the sprocket teeth by said guiding member.

In one embodiment of the invention, the chain is of the duplex type, and its link pivots are provided with freely rotatable rollers located between the link plates and designed to roll over the aforementioned guiding member, while each sprocket over which the chain runs is provided with two sets of teeth disposed in parallel planes sufficiently spaced from one another to provide passage for the rollers designed to cooperate with the guiding member.

In that section of the chain which operates in thrust, the greater the force transmitted, the more that section will resist any tendency to deviate from its straight general configuration. However, were that section of the chain to be subjected to a sudden, sufficiently large force, it could under certain circumstances buckle as the result of some of the links pivoting outwardly with reference to the direction of wrapping of the chain about the sprocket. In addition, it may also be useful for certain applications that the chain retain a straight configuration in some overhanging section of its length, even if it is not being subjected to any thrusting force. Indeed it will be noted that, as already stated, the special chain hereinbefore referred to cannot bend in one direction yet retains its full flexibility in the other.

For this reason, the present invention also has for its object to provide additional means adapted to impart rigidity to the chain in the direction in which it previously did not have it, the object being to meet special requirements or to provide a safety feature.

To this end, and in accordance with another particularity of the invention, each chain link is provided with a mobile fastening member and with associated means adapted to cooperate with the mobile fastening member of the adjacent link, so as to rigidly unite those two links in extension of each other, means being provided to control the mutual rigidity of said links over at least one part of their path and further means being provided for controlling their mutual loosening over at least another part of their path.

Through the provision of these additional means, the chain then becomes absolutely rigid in all directions on emerging from the transmission device.

In one embodiment, the means for rigidly uniting and loosening the links consist of cams mounted, in the path of said fastening members, within the casing enclosing the sprocket over which the chain runs, said cams being so designed that they bring said fastening members into position for rigid unification of the links at the place where the latter, having left the sprocket, are aligned once more, and that they bring said fastening members into the link-loosening position at the place where said members, while still aligned, are about to follow the curvature of the sprocket.

In one specific embodiment, each mobile fastening member consists of a pivoting hook and the associated means referred to consist of a notch made in the outer edge of the link, into which notch the hook on the adjacent link engages.

The invention also has for its object all such appliances or installations as comprise, by way of transmission means, a special chain as hereinbefore disclosed. The invention covers in particular devices utilized for handling and positioning press tools and other heavy objects of the type described in patent specification No. 126,626 filed by the applicants on July 25, 1961, in the United States, wherein the means used for moving the tool and/or the means for vertically displacing the platform supporting the device in question comprise a special chain as described hereinabove.

The present invention will be clearly understood from the description which follows with reference to the accompanying drawings, which are filed by way of example only and not of limitation and which illustrate a few possible embodiments of the invention.

Referring to the drawings filed herewith:

FIGURE 1 is a sectional view taken through the broken lines I—I of FIGURE 2, showing a transmission device according to the invention;

FIGURE 2 is a longitudinal sectional view through the line II—II in FIGURE 1;

FIGURE 3 is a cross-section taken through the line III—III in FIGURE 1;

FIGURE 4 is a front view of a single link of the chain in the device shown in FIGURES 1 to 3;

FIGURES 5 and 6 are respectively views in section through the line V—V in FIGURE 4 and in profile corresponding to FIGURE 4;

FIGURE 7 shows a link which is symmetrical to that of FIGURES 4 to 6;

FIGURES 8 and 9 are plan and profile views respectively, corresponding to FIGURE 7;

FIGURES 10 and 11 are front views of the two types of plate used to constitute the chain;

FIGURE 12 is a sectional view taken through the line XII—XII of FIGURE 13, showing another embodiment of a transmission device according to the invention;

FIGURE 13 is a sectional view taken through the broken lines XIII—XIII of FIGURE 12;

FIGURES 14, 15 and 16 are front elevation, plan and side elevation views, respectively, of a bare isolated link of the chain in the transmission device shown in FIGURES 12 and 13;

FIGURE 17 is a working diagram, in side elevation, of the system used for rigidly uniting the chain links;

FIGURE 18 is a corresponding plan view;

FIGURE 19 is a view similar to that of FIGURE 12, showing an alternative embodiment of the transmission device according to the invention;

FIGURE 20 is a side elevation viewed from the direction of arrow X—X in FIGURE 19, it being assumed that only the casing and the cams for controlling the system which rigidly unites the links are retained;

FIGURE 21 is a front elevation of a safety device used in the system for rigidly uniting the chain links;

FIGURE 22 is a sectional view on an enlarged scale, taken through the lines XXII—XXII of FIGURE 21; and FIGURE 23 is a front elevation view of an alternative embodiment of the safety device.

The transmission device shown in FIGURES 1 to 3 consists essentially of a chain of special structure generally designated by the reference numeral 1, a casing 2, and a sprocket wheel 3 mounted therein, over which the chain runs.

The chain 1 is composed of two sections, each of which consists of a succession of links which are disposed alternately and symmetrically relative to their longitudinal median plane, and these links will hereinafter be designated as right-hand links for those of the type shown in FIGURES 4 to 6, and as left-hand links for those of the type shown in FIGURES 7 to 9.

Each right or left-hand link consists of an assembly of two plates, to wit a mainplate such as illustrated in FIGURE 11, and an auxiliary plate as shown in FIGURE 10, the sense in which any two such plates are assembled together merely differing according to whether it is required to obtain a right- or a left-hand link.

The mainplate 11 is of generally rectangular shape, and its ends are formed in semi-circles concentric with the holes 12 through which extend the link coupling pivots.

The auxiliary plate 10 is of very special shape and provided, above a supporting portion 14 which is similar to a mainplate section, with a rectangularly shaped projection 15 which is parallel to the general direction of the link and offset in relation to the plane containing the link pivots.

The projection 15 is provided with a first operative front face 18 and a first operative rear face 19, both perpendicular to the plane containing the link pivots. The distance between the faces 18 and 19 is equal to the distance $d$ between the centres of the holes accommodating the two pivots of any single link.

The projection 15 is provided with a second operative front face 24 and a second operative rear face 25, located in a same plane parallel to the plane containing the pivots and on the same side thereof as the first two operative faces referred to precedingly.

In any given section of a straight length of chain, such as that illustrated in the upper portion of FIGURE 1, the front operative faces of each link abut against the rear operative faces of the next link.

For the purpose of simplifying manufacture, it may be convenient to ensure that while the chain is still new only the second operative faces 24 and 25 will be in contact from one link to the next, and that a slight clearance be provided between the corresponding first operative faces 18 and 19, but that after a certain amount of wear has taken place, all the aforementioned operative faces should eventually be in contact with one another.

The supporting portion 14 of each auxiliary plate 10 is provided with a hole 21 through which extends one pivot of the corresponding link but not the other.

In order to properly distribute the fatigue sustained by the various component parts of the chain links, the rear operative face 19 is contained in a plane located close to the centre of the line joining the two holes of a link.

Each auxiliary plate, as exemplified by reference numeral 10, is fixed flat on a main plate 11, by means for instance of two rivets 28 (see FIGURE 4) or alternatively by welding or any other convenient means, the pivot holes being coincident on one side or the other, depending on whether a right-hand link (FIGURES 4 to 6) or a left-hand link (FIGURES 7 to 9) is involved.

Along each section of a mounted chain executed in accordance with this invention, the auxiliary plates 10 (see FIGURE 2) will be contained in the same plane, and since the right-hand links are assembled in alternation with the left-hand links, the mainplates 11 will be located alternately to the right and to the left of that plane. The impaction obtained thus enhances the resistance of the chain to transverse flexing.

Each pivot such as 31 (see FIGURE 3) thus extends successively, for the first chain section, through a mainplate 11, an auxiliary plate 10 and a second mainplate 11, then, for the second chain section, through another mainplate, auxiliary plate and ultimate mainplate.

Each pivot 31 supports three further freely rotatable rollers, to wit a flanged guiding roller 32 midway along the pivot and a transmission roller 33 on each side thereof.

The transmission rollers 33 are designed to lodge in the hollows between the teeth 35 of the sprocket 3, and to this end the said sprocket 3 is provided with two rows of teeth 36 contained in two parallel planes the spacing between which is equal to that between the rollers 33.

In the interests of simplified assembly, which will be explained in greater detail hereinafter, the sprocket 3 is built in two parts, each of which carries one of the aforementioned sets of teeth. The two parts may be assembled together by any convenient means, such as screws 37 for example. The sprocket 3 is fixedly mounted on a shaft 41 which is journaled in the casing 2 and which, in the example considered, constitutes the power shaft. The power shaft may be rotated by any convenient means (not shown), for example by a hand crank or an electric motor with reduction gear, in order to exert through the top part of the chain a pulling or pushing force according to the direction in which it is desired to rotate the sprocket wheel.

The guiding rollers 32 are designed to roll over an external guiding member 43 and an internal guiding member 44. The external guiding member 43 is constituted by the edge of a plate which is clamped by spacers 46 between two plates 47 and 48 forming the main portion of the casing 2, said plates and spacers being secured together by means of threaded studs 49 for instance. The outline of the external guiding member 43 is concentric with the shaft 41 supporting the sprocket over which the chain runs and extends, in the specific embodiment illustrated, over a quarter of a circle 43a since the chain is to be deflected through a right angle as it runs through the casing and over the sprocket 3.

Beyond each point of tangential contact between the chain and the sprocket, this section of the outline extends through straight sections 43b and 43c respectively, over a length equal to at least twice the pivot-to-pivot distance in any link, thereby ensuring faultless operation of the chain throughout.

Similarly, the internal guiding member 44 is provided with a quarter-circle portion joined to two straight sections which are parallel and equal in length to the straight sections of the external guiding member. The internal guiding member is likewise secured by means of threaded studs 52 extending through the two casing plates and the locating spacers. It is provided with a large aperture to accommodate the central portion of the sprocket 3, and it is precisely in order to enable the sprocket 3 to be mounted in the internal guiding member that it is built up in two separate halves.

Referring now to FIGURE 1, there is shown thereon means for attaching the first chain link 54, in the form of an eye 55 which, in relation to the plane containing the link pivots, is offset outwardly when considering the chain as it runs over the sprocket.

FIGURE 1 also shows a horizontal surface 56 upon which the lower face of the chain rests.

A transmission device as hereinbefore described operates as follows:

Assuming the first link 54 to be attached to a load which it is desired to move along the horizontal surface 56, then if the sprocket wheel 3 be rotated in the direction of arrow f (see FIGURE 1), the horizontal upper sections of the chain 1 will operate in traction like an ordinary chain. On the other hand, if the wheel be rotated in the opposite direction, then the upper chain sections will be made to push the load before them and to consequently operate in compression. In the latter case, the front operative faces of each link of these straight sections of the chain thrust against the rear operative faces of the adjoining link, so that the projecting portions of all the links in these chain sections together form a veritable bar which is as rigid as a one-piece bar but which may nonetheless wrap itself around and hug the circular contour of the sprocket as it runs over it.

Manifestly, when the portion of the chain wrapped round the sprocket is working in compression, it will tend to escape from the sprocket teeth, but this tendency will be counteracted by the guiding rollers cooperating with the internal edge of the external guiding member 43. The external and internal guiding members thus prevent chain deformation in compression or in traction in proximity to the sprocket.

Referring now to FIGURES 12 and 13, there is shown thereon an alternative embodiment of the transmission device of FIGURES 1 to 3, like numerals being used to indicate like parts.

The chain 1a runs over a sprocket wheel 3 which is rigid with a shaft 41a supported in the inner races 101, 102 of two ball bearings 103, 104 the outer races 105, 106 of which are mounted in suitable housings provided in the two cheeks 47a and 48a of the casing, which casing is generally designated by 2a. Endwise positioning of the shaft and the ball bearing with reference to said casing is ensured, firstly, by snap-rings 111, 112 cooperating with annular grooves in shaft 41a and bearing against the outer faces of ball bearing inner faces 101, 102 and, secondly, by two further snap-rings 115, 116 which cooperate with grooves in the outer races 105, 106 of said ball bearings and bear against the inner faces of the two casing cheeks 48a and 47a.

Between the inner races of the ball bearings and the sprocket wheel 3 are interposed spacer rings 108, 109.

The chain is of the duplex variety, that is to say that each link is formed by assembling a mainplate such as 11a with an auxiliary plate such as 10a, which plates are shaped accordingly (see FIGURES 14 to 16).

Means are additionally provided for rigidly uniting each link with the following link in the straight section of the chain, together with means for loosening the links in the chain sections wrapped round the sprocket wheel.

To this end, the mainplate 11a of each link is provided with a notch 121 (see also FIGURE 17), and its auxiliary plate 10a with a hole 122 into which is fitted a pin 123 (see also FIGURE 18) which serves as a pivot for a hook 124 adapted to engage into notch 121 of the next link. The hook 124 has an opening 123a (FIGURE 17) for receiving pivot pin 123.

As in the embodiment described precedingly, the mainplates 11a of successive links are positioned alternately on either side of a plane common to the auxiliary plates 10a, so that each rigidity-imparting hook is located in the same plane as the mainplate with which it cooperates; the hooks therefore do not project beyond the mainplates, as a result of which the thickness of the chain is not increased by their presence.

The face 121a (see FIGURE 17) against which hook 124 engages is arcuate in shape and concentric with the hook pivot 123.

When a link hook is fully engaged into the notch of the succeeding link, as shown in FIGURE 17, the two links are aligned and rigidly united to each other.

In order to prevent them from being too distant from their locking positions, each hook is provided, beyond its pivotal axis, with an extension 125 the arcuate edge of which bears against the edge of the link which is opposite that adapted to be locked by that hook, as is clearly shown in FIGURE 12.

Engagement and disengagement of said hooks are positively effected, respectively, by a system of locking cams such as 131 (FIGURE 12) and 132 and by a system of disengaging cams such as 133 and 134, which cooperate with a pin such as 135 affixed to each hook and projecting outwardly from the corresponding lateral face of the chain section being considered.

Since the hooks are disposed alternately to the right and to the left of the median plane of each individual run of the chain, provision is likewise made, in regard to each of the two runs of the duplex chain, for a second set of cams such as 132a, 134a for the left-hand portion of the right-hand run shown in FIGURE 13. In the bottom part of the casing are also to be found two cams 132b, 134b for the right-hand portion of the left-hand run of the chain, and two cams 132c, 134c for the left-hand portion of that run. Thus the lower part of the casing is provided with eight cams and the upper part in similar fashion with eight cams which cooperate with associated pins on the hooks.

The locking cams such as 131 are so positioned that when a link locates itself in precise alignment with the preceding link as it rolls off the chain, its pin 135 comes into contact with said cam in such manner as to be thrust away and caused to engage the hook into the corresponding notch in said preceding link.

Conversely, each disengaging cam such as 133 is so positioned that it moves the pin 135 of each hook soon enough so that the hook will be fully disengaged when the link carrying it comes into contact with the sprocket wheel and is about to pivot with respect to the next link.

Operation takes place as follows: assuming the chain to be travelling in the direction of arrow f (see FIGURE 12), then as the upper portion of the chain rolls off, each hook pin 135 is thrust away by cam 131 and the hook it carries engages into the notch in the preceding link while the latter is still being guided through casing 2a, so that when the chain emerges from said casing all its links are rigidly united with one another by the hooks and may therefore be likened to a bar that is rigid in all directions.

The lower part of the chain which is to wrap round the sprocket wheel must be able to flex about the latter and its links must be therefore loosened from one another before they come into contact with said sprocket wheel, and for this reason each hook pin 135 is thrust away by cam 134 so that the corresponding hook disengages from the preceding link before the latter has begun to pivot as it runs over the sprocket wheel. As soon as the mutual pivotal motion of the links has begun, the hooks can no longer engage into the notches and the chain therefore wraps itself freely round the sprocket wheel.

The other extremity of the part forming the cam 133 is cut to the shape of a ramp 141 which is adapted to progressively thrust outwardly the pins of such hooks as, under the effect of gravity, may have already swung into abutment against the preceding links and would otherwise jam against said part.

In order to prevent certain hooks from being accidentally disengaged along the straight outer part of the chain, safety means are provided for maintaining them in the engaged position.

In the embodiment shown in FIGURE 21, the safety means consist of a spring 144 one extremity of which is made rigid with the hook extension, for instance by being anchored therein (see also FIGURE 22), and the other extremity of which bears against the edge of the following link.

Under such conditions, except for the time when, in response to the action of the cams, they are positively thrust away from the notches in the associated links, or when their extremities butt against the edges of the links alongside the notches, the hooks will be biased into the bottoms of said notches, in the locking position, by the springs.

In yet another alternative embodiment shown in FIGURE 23, the safety means referred to consist of a small plastic block 146, made of nylon for instance, which engages into a notch provided in the hook bore accommodating the hook pivot and which presses strongly against said pivot. Thus, to move the hook away from its locking position, a torque must be exerted to counter the friction torque set up by the plastic block 146.

Naturally, by way of a variant on this method of construction, said plastic block could be accommodated in a notch provided in the pivot and be caused to rub against the inner surface of said bore.

In the alternative method of construction illustrated in FIGURES 19 and 20, one run of the chain is horizontal and the other vertical, so that the chain as a whole is bent at right angles inside the casing used for the transmission device.

The entire upper part of the device is identical to that described with reference to the embodiment shown in FIGURES 12 and 13, and, here again, like numerals have been used to designate like parts.

The vertical lower part of the chain hangs freely, and in this specific embodiment it has been assumed that this part of the chain need not be maintained rigid. For this reason, no provision is made in the casing, in respect of this part of the chain, for a hook-engaging cam similar to the cam 131 provided for the upper part of the chain. On the other hand, a disengagement cam 134 has been provided, as it is indispensable for extracting from their notches any hooks that may have inadvertently become engaged therein, so that the links can pivot freely about one another when they run onto the sprocket wheel as the chain rises once more.

In FIGURE 20, only the casing 2b and the cams are shown, in order to clearly illustrate the positioning of the latter.

While there has been shown and described, the presently preferred embodiments of the transmission device of this invention, it will be well understood by those skilled in the art that various changes and modifications may be made to these embodiments to suit specific applications, within the spirit and scope of the invention. By way of example, the operative faces of the link projections may be formed in any convenient manner, for instance as oblique faces.

What is claimed is:

1. A chain comprising at least one row of alternating inner and outer elongated side plate links, successive pivot pins interconnecting said links, each of said links having a first opening near its forward end for receiving a pivot pin and a second opening near its rear end for receiving the next successive pivot pin, an auxiliary plate member secured to the outer face of each inner link and an auxiliary plate member secured to the inner face of each outer link, each auxiliary plate member having a semi-circular forward end surface and a rear end surface extending between said first and said second opening of the associated link in a direction substantially perpendicular to the center line thereof, said auxiliary plate member having an opening near said forward end surface thereof and registering with said first opening of the associated link to permit the passage of a pivot pin therethrough, and a lateral, rearwardly projecting, substantially rectangular extension on one longitudinal edge of said auxiliary plate member, the length of said auxiliary plate member as well as the length of said extension being equal to the distance between the axes of said first and said second openings of the associated links so that a portion of said rear end surface of each auxiliary plate member is in contact with a portion of said front end surface of a next following auxiliary plate member at least when the links are out of alignment, and so that one end of each extension engages the other end of a next following extension when the links are in alignment.

2. A chain according to claim 1, in which said rear end surface of the auxiliary plate member and the inner longitudinal surface of said extension are joined by an arcuate end surface of the auxiliary plate member concentric with said second opening of the associated link and having substantially the same radius as said forward end surface of the auxiliary plate member.

3. A chain according to claim 1, in which the inner longitudinal surface of said extension is in alignment with the longitudinal surface of the auxiliary plate member extending between said forward end surface thereof and the forward end of said extension.

4. A transmission device comprising in combination with a chain as claimed in claim 1, a casing, a shaft mounted within said casing, a toothed tracking member mounted on said shaft and over which said chain runs, said casing including chain guiding means disposed at least along the extent of the convex portion of said chain so that when a pushing force is to be transmitted said chain will be retained in engagement with said tracking member, a pivoted hook carried by each auxiliary plate, pivot means for each hook extending transversely of the direction of movement of the chain, each plate link having a notch therein with which said hooks are engageable so as to rigidly unite two successive chain links to each other, a pin extending laterally of each hook, cam means mounted within the casing in the path of movement of the chain at spaced locations along said path of movement for cooperation with said pins to control mutual rigidity of the links, the cam means at one location effecting engagement of the hooks with the notches and in another location disengaging said hooks from the notches, each hook being in face to face engagement with the respective auxiliary plate members and each hook including an extension from the side of the pivot means remote from the notch adapted to abut against the side plate link of the next following chain link so as to restrict the pivoting movement of the respective hooks to a degree only sufficient to permit disengagement of the hooks from the notches.

5. A transmission as claimed in claim 4 in which said hook members are spring loaded and include a spring blade having one end cooperating with the extension of the hook and the other end cooperating with the upper face of the following side plate link.

6. A transmission as claimed in claim 4 and further including friction means interposed between each hook and the pivot on which it is mounted.

7. A chain according to claim 1 for running over a toothed tracking member, said chain having end link means at opposite ends thereof characterized in that at least one of said end link means of the chain terminates in a fastening member, such as an eye which, in relation to the plane containing the link pivots, is located externally thereto with respect to the tracking member over which said chain runs.

8. A transmission device, characterized in that it comprises a chain according to claim 1 and a toothed tracking member over which the chain runs, a casing, a shaft mounted in said casing for supporting said tracking member, said casing including a chain guiding means coaxial with said shaft and disposed along the length of the convex face of said chain, so that when a pushing force is to be transmitted said chain shall be retained in engagement with said tracking member and in particular with the teeth thereof, by said guiding means.

9. A device according to claim 8, further comprising a second guiding means which extends along the length of the concave face of the chain.

10. A device according to claim 9, in which each guiding means extends along the length of the straight sections of the chain, from their points of tangential contact with the tracking member over a certain distance which is at least twice the length of a single link.

11. A device according to claim 9 characterized in that said chain is of the duplex type comprising two sections, freely rotating rollers mounted on said pivot pins between said two sections and adapted to cooperate with said guiding means.

12. A device according to claim 11 characterized in that each toothed tracking member over which the chain runs comprises two sets of teeth disposed in parallel planes which are sufficiently spaced from each other to provide a passage for said rollers cooperating with said guiding means.

13. A transmission device according to claim 8, characterized in that each chain link further comprises a mobile fastening member and associated means adapted to cooperate with the mobile fastening member of the adjacent link, so as to rigidly unite those two links in extension of each other, means being provided to control the mutual rigidity of said links over at least one part of their path and further means being provided for controlling their mutual loosening over at least another part of their path.

14. A device according to claim 13, characterized in that the means for rigidly uniting and loosening the links consist of cams mounted, in the path of said fastening members, within the casing enclosing said toothed tracking member over which the chain runs, said cams being so designed that they bring said fastening members into the position for rigid unification of the links at the place where the latter, having left the sprocket, are aligned once more, and that they bring said fastening members into the link-loosening position at the place where said members, while still aligned, are about to follow the curvature of said toothed tracking member.

References Cited in the file of this patent

UNITED STATES PATENTS

| | | |
|---|---|---|
| 1,584,198 | Stevens | May 11, 1926 |
| 1,870,244 | Elston | Aug. 9, 1932 |
| 2,045,261 | Clute | June 23, 1936 |
| 2,602,345 | Braumiller | July 8, 1952 |